US008037265B2

(12) United States Patent
Usami

(10) Patent No.: US 8,037,265 B2
(45) Date of Patent: Oct. 11, 2011

(54) STORAGE SYSTEM AND DATA MANAGEMENT METHOD

(75) Inventor: Kazuhiro Usami, Odawara (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 1098 days.

(21) Appl. No.: 11/672,172

(22) Filed: Feb. 7, 2007

(65) Prior Publication Data

US 2008/0091896 A1    Apr. 17, 2008

(30) Foreign Application Priority Data

Oct. 11, 2006    (JP) ................................ 2006-277921

(51) Int. Cl.
*G06F 12/16*    (2006.01)
(52) U.S. Cl. ................. 711/162; 711/161; 711/E12.103
(58) Field of Classification Search .................... 711/162
See application file for complete search history.

(56) References Cited

U.S. PATENT DOCUMENTS

| 6,269,381 | B1 | 7/2001 | St. Pierre et al. | |
| 6,959,369 | B1* | 10/2005 | Ashton et al. | 711/162 |
| 2002/0156918 | A1* | 10/2002 | Valdevit et al. | 709/238 |
| 2004/0205391 | A1* | 10/2004 | Thompson | 714/13 |
| 2006/0143422 | A1* | 6/2006 | Mashima et al. | 711/170 |
| 2007/0050575 | A1* | 3/2007 | Uratani et al. | 711/162 |

FOREIGN PATENT DOCUMENTS

| EP | 1 645 960 | 4/2006 |
| JP | 11-242570 | 9/1999 |

* cited by examiner

*Primary Examiner* — Kenneth M Lo
(74) *Attorney, Agent, or Firm* — Antonelli, Terry, Stout & Kraus, LLP.

(57) ABSTRACT

Storage system and data management method to reduce the load on a virtualization apparatus by executing backup processing or restoration processing within one apparatus in which an externally connected storage apparatus and a tape library apparatus are installed. The storage system includes a virtualization apparatus and an external storage apparatus; the virtualization apparatus having: an actual volume for storing data sent from a host apparatus, formed in a storage area provided by a physical disk; and a virtual volume paired with the actual volume, for storing replicated data for the data, and the external storage apparatus having: a logical volume that functions as an actual storage area for the virtual volume; and a tape associated with the logical volume, for storing the replicated data, wherein the external storage apparatus has a copy unit for copying the replicated data stored in the logical volume to the tape.

9 Claims, 11 Drawing Sheets

FIG.2

| BACKUP SOURCE GROUP NUMBER (24A) | SCHEDULE NAME (24B) | BACKUP DESTINATION TAPE GROUP NUMBER (24C) |
|---|---|---|
| 0 | schdule_day | 0,1,2,3,4,5 |
| 0 | schdule_week | 6,7,8,9 |
| 1 | schdule_week | 10,11,12,13 |
| ⋮ | ⋮ | ⋮ |

| | |
|---|---|
| TAPE GROUP NUMBER | 63A |
| BACKUP DATE | 63B |
| KEYWORD | 63C |
| NO. OF STORAGE LUs IN USE | 63D |
| NUMBERS FOR STORAGE LUs IN USE | 63E |
| COPY STATUS | 63F |
| COMPLETION PERCENTAGE | 63G |

| LU NUMBER | RAID GROUP NUMBER | BACKUP PERFORMANCE (MB/s) |
|---|---|---|
| 3 | 0 | 160 |
| 1 | 0 | 160 |
| 2 | 0 | 140 |
| 0 | 0 | 120 |
| 5 | 1 | 180 |
| 4 | 1 | 160 |
| 6 | 2 | 120 |
| 8 | 2 | 120 |
| 7 | 2 | 80 |
| 9 | 3 | 180 |
| ⋮ | ⋮ | ⋮ |

| PATH NUMBER (65A) | TRAFFIC THRESHOLD (MB/s) (65B) | CURRENT TRAFFIC (MB/s) (65C) |
|---|---|---|
| 2 | 360 | 160 |
| 3 | 360 | 180 |
| 1 | 360 | 320 |
| 0 | 360 | 340 |

| RAID GROUP NUMBER (66A) | TRANSFER FLAG (66B) |
|---|---|
| 0 | 1 |
| 1 | 1 |
| 2 | 1 |
| 3 | 0 |
| ⋮ | ⋮ |

66

US 8,037,265 B2

STORAGE SYSTEM AND DATA MANAGEMENT METHOD

CROSS-REFERENCES TO RELATED APPLICATIONS

This application relates to and claims priority from Japanese Patent Application No. 2006-277921, filed on Oct. 11, 2006, the entire disclosure of which is incorporated herein by reference.

BACKGROUND

1. Field of the Invention

The present invention relates to a storage system and a data management method. More specifically, the invention relates to technology for backing up or restoring data using an externally connected storage apparatus.

2. Description of Related Art

Conventionally, as external storage apparatuses for replicating data sent from general-purpose computers (called host apparatuses), tape library apparatuses using magnetic tape cartridges, and storage apparatuses using volumes logically defined in a storage area provided by physical disks (hereinafter referred to as logical volumes) are used.

Also, connected between host apparatuses and external storage apparatuses, a virtualization apparatus is used to provide the host apparatuses with logical volumes virtually defined in a storage area provided by physical disks (hereinafter simply referred to as virtual volumes).

Examples of a method for backing up data sent from a host apparatus at high speeds using the above-described apparatuses include the following.

Data sent from a host apparatus is first stored in volumes provided in a virtualization apparatus and logically defined in a storage area provided by physical disks (hereinafter simply referred to as logical volumes). Then, the data stored in the logical volumes is replicated in other logical volumes via backup processing on a per-volume basis. That replicated data for the data is stored in virtual volumes, but actually is stored in logical volumes provided in a storage apparatus connected externally to the virtualization apparatus.

Meanwhile, in the backup processing, in order to protect data and achieve improved reliability, several generations of backup data should be created. In common backup processing, backup data is made in inexpensive tape library apparatuses, i.e., replicated data is transferred from a virtualization apparatus to a tape library apparatus via a backup server, and stored there.

JP11-242570 A discloses techniques for installing a magnetic disk apparatus having magnetic disks and a tape library apparatus in one external storage apparatus, and executing data backup and restoration between the magnetic disk apparatus and the tape library apparatus, enabling the realization of efficient management of data storage capacity and efficient data access.

SUMMARY

Replicated data can be transferred to an externally connected storage apparatus at very high speeds, but physical disks for forming logical volumes are expensive. On the other hand, magnetic tapes are inexpensive, but the speeds for transferring replicated data to those magnetic tapes are low.

Also, when replicated data is transferred from a virtualization apparatus to a tape library apparatus via a backup server and a backup of the replicated data is made there, the speed at which the replicated data is transferred is very low. In addition, there is another problem in that the load on the virtualization apparatus during the backup operation affects the main operation of the virtualization apparatus.

In particular, when backing up replicated data on a per-file basis in the situation where several servers are connected, the same number of backup servers is required, as there are different types of OS (Operating Systems). So, if backup data is going to be made using a backup server in those circumstances, an expensive and complicated structure is required and system management also becomes complicated.

Even when transferring replicated data on a per-file basis directly from an externally connected storage apparatus via a backup server, the overhead arising from that backup operation inevitably results in lower backup performance relative to the backup operation on a per-volume basis.

The above also applies to restoration processing.

In light of the above, it is an object of the present invention to provide a storage system and data management method that can reduce the load on a virtualization apparatus by executing backup processing or restoration processing within one external storage apparatus in which both an externally connected storage apparatus and a tape library apparatus are installed together.

In order to achieve the above object, the present invention provides a storage system including a virtualization apparatus and an external storage apparatus; the virtualization apparatus having: an actual volume for storing data sent from a host apparatus, formed in a storage area provided by a physical disk; and a virtual volume paired with the actual volume, for storing replicated data for the data, and the external storage apparatus having: a logical volume that functions as an actual storage area for the virtual volume; and a tape associated with the logical volume, for storing the replicated data, wherein the external storage apparatus has a copy unit for copying the replicated data stored in the logical volume to the tape.

Accordingly, it is possible to execute backup processing within the external storage apparatus without affecting the virtualization apparatus.

The present invention also provides a storage system including a virtualization apparatus and an external storage apparatus; the virtualization apparatus having: an actual volume for storing data sent from a host apparatus, formed in a storage area provided by a physical disk; a virtual volume paired with the actual volume, for storing replicated data for the data; and a work virtual volume for storing the replicated data when it has been copied back for restoration, and the external storage apparatus having: a logical volume that functions as an actual storage area for the virtual volume; and a tape associated with the logical volume, for storing the replicated data; and a work logical volume associated with the work virtual volume, wherein the external storage apparatus has a controller unit for copying back the replicated data stored on the tape for restoration in response to a restoration command from the host apparatus, and storing the replicated data that has been copied back in the work logical volume.

Accordingly, it is possible to execute restoration processing on a per-file basis from the work logical volume, in which the replicated data has been restored at high speeds on a per-volume basis.

The present invention also provides a data management method for a storage system provided with a virtualization apparatus for storing data sent from a host apparatus, and an external storage apparatus connected to the virtualization apparatus, the method including: a step of the virtualization apparatus pairing an actual volume with a virtual volume; the actual volume being formed in a storage area provided by a physical disk and storing the data, and the virtual volume storing replicated data for the data; a step of the external storage apparatus associating a logical volume that functions as an actual storage area for the virtual volume with a tape for storing the replicated data; and a copy step of the external storage apparatus copying the replicated data stored in the logical volume to the tape.

Accordingly, it is possible to execute backup processing within the external storage apparatus without affecting the virtualization apparatus.

The present invention also provides a data management method for a storage system provided with a virtualization apparatus for storing data sent from the host apparatus, and an external storage apparatus connected to the virtualization apparatus, the method including: a step of the virtualization apparatus pairing an actual volume with a virtual volume; the actual volume being formed in a storage area provided by a physical disk and storing the data, and the virtual volume storing replicated data for the data; a step of the virtualization apparatus forming a work virtual volume for storing the replicated data when it has been copied back for restoration; a step of the external storage apparatus associating a logical volume that functions as an actual storage area for the virtual volume with a tape for storing the replicated data; a step of the external storage apparatus forming a work logical volume associated with the work virtual volume; and a control step of the external storage apparatus copying back the replicated data stored on the tape for restoration in response to a restoration command from the host apparatus, and storing the replicated data that has been copied back in the work logical volume.

Accordingly, it is possible to execute restoration processing on a per-file basis from the work logical volume, in which the replicated data has been restored at high speeds on a per-volume basis.

According to the present invention, an externally connected storage apparatus and a tape library apparatus are formed as one apparatus, and replicated data is backed up separately from a virtualization apparatus. As a result, it is possible to reduce the load on the virtualization apparatus during backup and improve performance in the main operation of the virtualization apparatus. It is also possible to improve backup performance.

Also, according to the present invention, since an externally connected storage apparatus and a tape library apparatus are formed as one apparatus, the devices and software required decrease, resulting in cost reduction, and the apparatus reliability can also be improved.

Also, according to the present invention, it is possible to store replicated data of the latest generation in physical disks while storing the latest generation and several older generations of that replicated data on magnetic tapes, resulting in inexpensive and high performance backup.

Other aspects and advantages of the invention will be apparent from the following description and the appended claims.

BRIEF DESCRIPTION OF THE DRAWINGS

FIG. 2 is a chart showing a generation management table according to the first embodiment.

FIG. 3 is a chart showing tape group information according to the first embodiment.

FIG. 4 is a chart showing a backup target LU table according to the first embodiment.

FIG. 5 is a chart showing a path traffic management table according to the first embodiment.

FIG. 6 is a chart showing a RAID group transfer status table according to the first embodiment.

DETAILED DESCRIPTION OF PREFERRED EMBODIMENTS

Embodiments of the present invention will be explained in detail below with reference to the attached drawings.

(1) First Embodiment (1-1) Storage System Configuration in the First Embodiment

A storage system according to the first embodiment will be described below.

Figure 1:
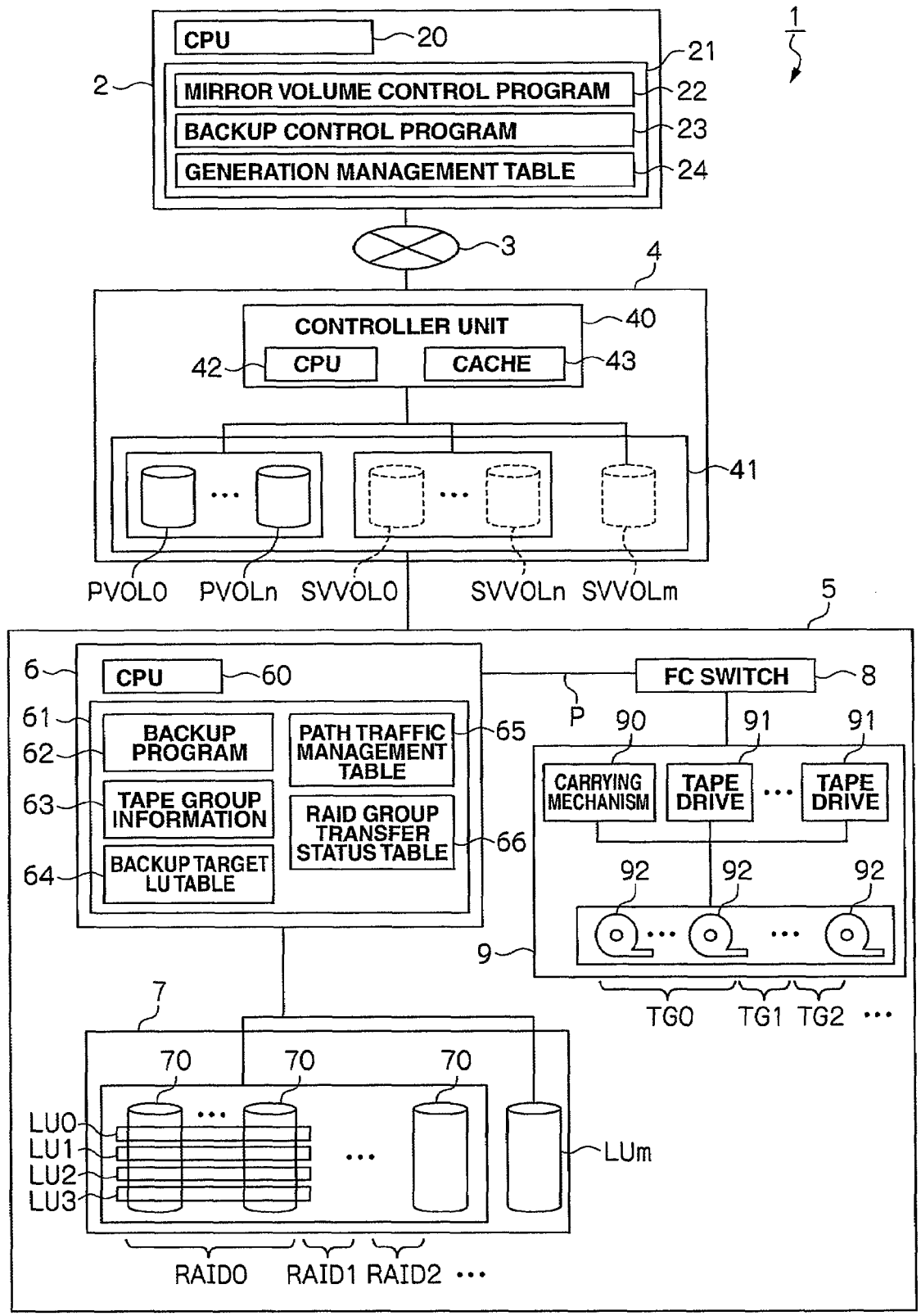
FIG. 1 is a block diagram illustrating the overall configuration of a storage system according to a first embodiment of the invention.

In FIG. 1, the reference numeral 1 indicates the overall storage system according to the first embodiment. The storage system 1 is configured to include a host apparatus 2, a virtualization apparatus 4 connected to the host apparatus 2 via a network 3, and an external storage apparatus 5 connected to the virtualization apparatus 4.

The host apparatus 2 is a computer device provided with information processing resources, such as a CPU (Central Processing Unit) 20 and memory 21, and it is, for example, a personal computer, workstation, mainframe, or similar. The host apparatus 2 is also provided with an information input device (not shown in the drawing), e.g. a keyboard, a switch, a pointing device, or a microphone, and an information output device (not shown in the drawing), e.g. a monitor display or a speaker.

In the memory 21 of the host apparatus 2, a mirror volume control program 22 and a backup control program 23 are installed, and a generation management table 24 is also stored, too. Those programs 22 and 23, and the generation management table 24 will be explained later.

The network 3 is, for example, a SAN (Storage Area Network), a LAN (Local Area Network), the Internet, a public line, a dedicated line, or similar. Communication between the host apparatus 2 and the virtualization apparatus 4 via the above network 3 is conducted based on, for example, Fibre Channel Protocol if the network 3 is a SAN, and TCP/IP (Transmission Control Protocol/Internet Protocol) if the network 3 is a LAN.

The virtualization apparatus 4 is configured to include a controller unit 40 and a device unit 41.

The controller unit 40 is configured as a microcomputer system provided with a CPU 42, memory (not shown in the drawing), a cache 43, and a communication interface or similar, and controls commands and data sent from the host apparatus 2 so that the commands and data are sent and received between the host apparatus 2 and the external storage apparatus 5.

The cache 43 is mainly used to temporarily store data to be input/output to/from the virtualization apparatus 4.

The device unit 41 is composed of a plurality of hard disk drives (not shown in the drawing), e.g. expensive hard disk drives such as SCSI (Small Computer System Interface) disks, or inexpensive hard disk drives such as SATA (Serial AT Attachment) disks.

In a storage area provided by the above hard disk drives, one or more logical volumes are defined (not shown in the drawing), and data from the host apparatus 2 is read/written from/to the logical volume(s) in blocks of a predetermined size.

Each logical volume is assigned a unique identifier (LUN: Logical Unit Number). In this embodiment, the above identifier is combined with a unique number assigned to each block (LBA: Logical Block Address) to form an address, and user data is input/output specifying a particular address of that type.

The logical volumes formed in the virtualization apparatus 4 include primary volumes (PVOLs) and secondary volumes (SVOLs). The secondary volumes are logical volumes used for backing up the primary volumes. If a failure occurs in a primary volume, that primary volume can be quickly reproduced using the relevant secondary volume. As for the logical volume attribute, there are actual volumes $PVOL_0$-$PVOL_n$ and virtual volumes $SVVOL_0$-$SVVOL_n$. In this embodiment, the primary volumes are defined as the actual volumes $PVOL_0$-$PVOL_n$, and the secondary volumes are defined as the virtual volumes $SVVOL_0$-$SVVOL_n$.

The actual volumes $PVOL_0$-$PVOL_n$ are logical volumes to which a certain storage area has been allocated, so data can be actually input/output to/from the actual volumes.

On the other hand, the virtual volumes $SVVOL_0$-$SVVOL_n$ are virtual logical volumes that do not actually exist. Each of the virtual volumes $SVVOL_0$-$SVVOL_n$ is associated with one or more of the actual volumes $PVOL_0$-$PVOL_n$, forming a pair. If data input/output requests are directed to the virtual volumes $SVVOL_0$-$SVVOL_n$ during backup processing or restoration processing executed by the virtualization apparatus 4, relevant data is read/written from/to any of logical volumes $LU_0$-$LU_n$ (explained later) in the external storage apparatus 5, which has been associated with the virtual volumes $SVVOL_0$-$SVVOL_n$.

At least one of the virtual volumes $SVVOL_0$-$SVVOL_n$ is assigned as a virtual command volume $SVVOL_m$.

In this embodiment, data sent from the host apparatus 2 is stored in any of the actual volumes $PVOL_0$-$PVOL_n$. The actual volumes $PVOL_0$-$PVOL_n$ are associated with the virtual volumes $SVVOL_0$-$SVVOL_n$, which are also associated with the logical volumes $LU_0$-$LU_n$ (explained later) in the external storage apparatus 5, and the replica of the data stored in the actual volumes $PVOL_0$-$PVOL_n$ is stored as the replicated data in the relevant logical volumes $LU_0$-$LU_n$.

The virtual command volume $SVVOL_m$ is associated with a logical command volume $LU_m$ (explained later) in the external storage apparatus 5. As a result, if a command is given by the host apparatus 2 for the virtual command volume $SVVOL_m$, that command is transferred to the logical command volume $LU_m$ associated with the virtual command volume $SVVOL_m$.

The external storage apparatus 5 is configured to include a controller unit 6, a device unit 7, an FC switch 8, and a tape library 9.

The controller unit 6 is configured as a microcomputer system provided with a CPU 60, memory 61, and a communication interface or similar, and controls commands and data sent/received to/from the host apparatus 2 via the virtualization apparatus 4.

The device unit 7 is composed of a plurality of hard disk drives 70, e.g. expensive hard disk drives such as SCSI (Small Computer System Interface) disks, or inexpensive hard disk drives such as SATA (Serial AT Attachment) disks.

In a storage area provided by the above hard disk drives 70, one or more logical volumes $LU_0$-$LU_n$ are defined, and replicated data from the associated virtual volumes $SVVOL_0$-$SVVOL_n$ is read/written from/to those logical volumes $LU_0$-$LU_n$ in blocks of a predetermined size. The logical volumes $LU_0$-$LU_n$ have the same configuration as that of the logical volumes $PVOL_0$-$PVOL_n$ in the virtualization apparatus 4, so their detailed explanation will be omitted.

A logical command volume $LU_m$, which is one of the logical volumes $LU_0$-$LU_n$, is associated with the virtual command volume $SVVOL_m$.

The FC switch 8 is a switch connected to the controller unit 6 and the tape library 9 via a network where Fibre Channel Protocol is used, and is used for transferring data via switching. The FC switch 8 transfers replicated data stored in the logical volumes $LU_0$-$LU_n$ to the tape library 9 via the controller unit 6, using a data transfer path called path P.

The tape library 9 is configured to include: tape drives 91; tape cartridges 92; a carrying mechanism 90 for carrying the tape cartridges 92; a CPU (not shown in the drawing) for controlling the carrying mechanism 90; and memory (not shown in the drawing) that stores a control program for controlling the carrying mechanism 90.

The tape drives 91 are drive units for reading/writing replicated data from/to the tape cartridges 92. Using the tape drives 91, replicated data can be stored on the tape cartridges 92.

The tape cartridges 92 store replicated data stored in the logical volumes $LU_0$-$LU_n$.

(1-2) Backup Function

Next, the backup function provided in the storage system 1 according to this embodiment configured as above will be explained.

The storage system 1 is characterized by storing replicated data of the latest generation in the logical volumes associated with the virtual volumes, and also storing several older generations of the replicated data stored in the above logical volumes on the tapes on a per-volume basis, thereby enabling the external storage apparatus 5 to execute backup processing internally by itself.

In order to realize the above-described backup function, a mirror volume control program 22 and a backup control program 23 are installed, and a generation management table 24 is stored, in the host apparatus 2.

Meanwhile, a backup program 62 is installed in the external storage apparatus 5, and tape group information 63, a backup target LU table 64, a path traffic management table 65 and a RAID (Redundant Array of Inexpensive Disks) group transfer status table 66 are also stored in the external storage apparatus 5.

In the below explanation, the various tables 24 and 63-66 will be explained first, and the various programs 22, 23 and 62 will be explained later.

(1-2-1) Generation Management Table

As shown in FIG. 2, the generation management table 24 is a table for managing the source-destination relationship when making backups of replicated data within the external storage apparatus 5. The generation management table 24 is composed of a "backup source group number" field 24A, a "schedule name" field 24B, and a "backup destination tape group number" field 24C.

The "backup source group number" field 24A stores the number given to a group formed by dividing the logical volumes $LU_0$-$LU_n$ associated with the virtual volumes $SVVOL_0$-$SVVOL_n$, which are backup sources that store the replicated data.

The "schedule name" field 24B stores information for managing how backups of the replicated data are updated. For example, if the field 24B stores "schedule_day," it shows that backups of the replicated data are updated every day, and if the field 24B stores "schedule_week," it shows that backups of the replicated data are updated every week.

The generation management table 24 shows, for example, that a "backup source group number" of "1" is associated with the "backup destination tape group numbers" of "10," "11," "12," and "13," showing that the relevant replicated data is stored in the tape groups "10"-"13." In other words, the number of backups (generations) made for particular replicated data is four, i.e., four generations in the tape groups "10" to "13." So, it is possible to manage several generations of replicated data, by switching the tape cartridges 92 associated with any of the destination tape group numbers in accordance with the intended generation.

(1-2-2) Tape Group Information

As shown in FIG. 3, the tape group information 63 includes update history information about a backup of the replicated data made in a particular tape group. The tape group is a group made by selecting several tape cartridges and putting them together. The tape group information 63 specifically includes: information 63A, indicating the tape group number; information 63B, indicating the backup date when the replicated data was backed up; information 63C, indicating a keyword, which is a random string set by a user to identify the backup; information 63D, indicating the number of logical volumes that store the backed-up replicated data; information 63E, indicating the logical volume numbers given to the logical volumes that store the backed-up replicated data; copy status information 63F, indicating the status (e.g. accessible mode, backup mode, restoration mode, error mode, or undefined mode) of the logical volumes that store the backed-up replicated data; and information 63G, indicating what percent of the backup or restoration process has been completed.

In particular, the backup date information 63B stores historical information indicating when several generations (backups) of particular replicated data were updated.

(1-2-3) Backup Target LU Table

As shown in FIG. 4, the backup target LU table 64 is a table for managing backup sources in the external storage apparatus 5, each source storing replicated data. The backup target LU table 64 is composed of a "logical volume number" field 64A, a "RAID group" field 64B, and a "backup performance" field 64C.

The "logical volume number" field 64A stores the volume number given to each of the logical volumes $LU_0$-$LU_n$ formed with the hard disk drives 70 in the external storage apparatus 5. The controller unit 6 in the external storage apparatus 5 manages replicated data on a per-volume basis.

The "RAID group" field 64B stores the group number given to each RAID group, to which several logical volumes ($LU_0$-$LU_n$) belong.

The "backup performance" field 64C stores information about the data transfer speed (MB/s) when a backup of the replicated data in a particular logical volume ($LU_0$-$LU_n$) was previously made in the tape library 9.

(1-2-4) Path Traffic Management Table

As shown in FIG. 5, the path traffic management table 65 is a table for managing the amount of replicated data that runs through a data transfer path between the controller unit 6 and the FC switch 8. The path traffic management table 65 is composed of a "path number" field 65A, a "traffic threshold" field 65B, and a "current traffic" field 65C.

The "path number" field 65A stores the number given to a path P, which is a data transfer path between the controller unit 6 and the FC switch 8. In this embodiment, there are four paths, but the number of paths is not limited to four.

The "traffic threshold" field 65B stores the maximum transfer rate (MB/s) at which data can be transferred via a particular path P.

The "current traffic" field 65C stores the amount of replicated data (MB/s) currently running through a particular path P.

(1-2-5) RAID Group Transfer Status Table

As shown in FIG. 6, the RAID group transfer status table 66 is a table for managing the transfer status of the replicated data stored in the logical volumes ($LU_0$-$LU_n$) within a particular RAID group. The RAID group transfer status table 66 is composed of a "RAID group number" field 66A and a "transfer flag" field 66B.

The "RAID group number" field 66A stores the number given to a RAID group formed by grouping several logical volumes ($LU_0$-$LU_n$) together. Here, the RAID group is a group prepared so that multiple hard disk drives can be operated based on RAID.

The "transfer flag" field 66B stores information indicating whether the replicated data stored in the logical volumes ($LU_0$-$LU_n$) within a particular RAID group is being transferred or not. In this embodiment, a flag of "1" is stored if the replicated data is being transferred, otherwise, a flag of "0" is stored.

(1-3) Storage System Operation

Next, how data from the host apparatus 2 is stored and backed up in the storage system 1 will be explained below. The following explanation will be made focusing on one actual volume $PVOL_0$, one virtual volume $SVVOL_0$, and one tape cartridge 92, from among the several volumes $PVOL_0$-$PVOL_n$, virtual volumes $SVVOL_0$-$SVVOL_n$, and tape cartridges 92.

Figure 7:
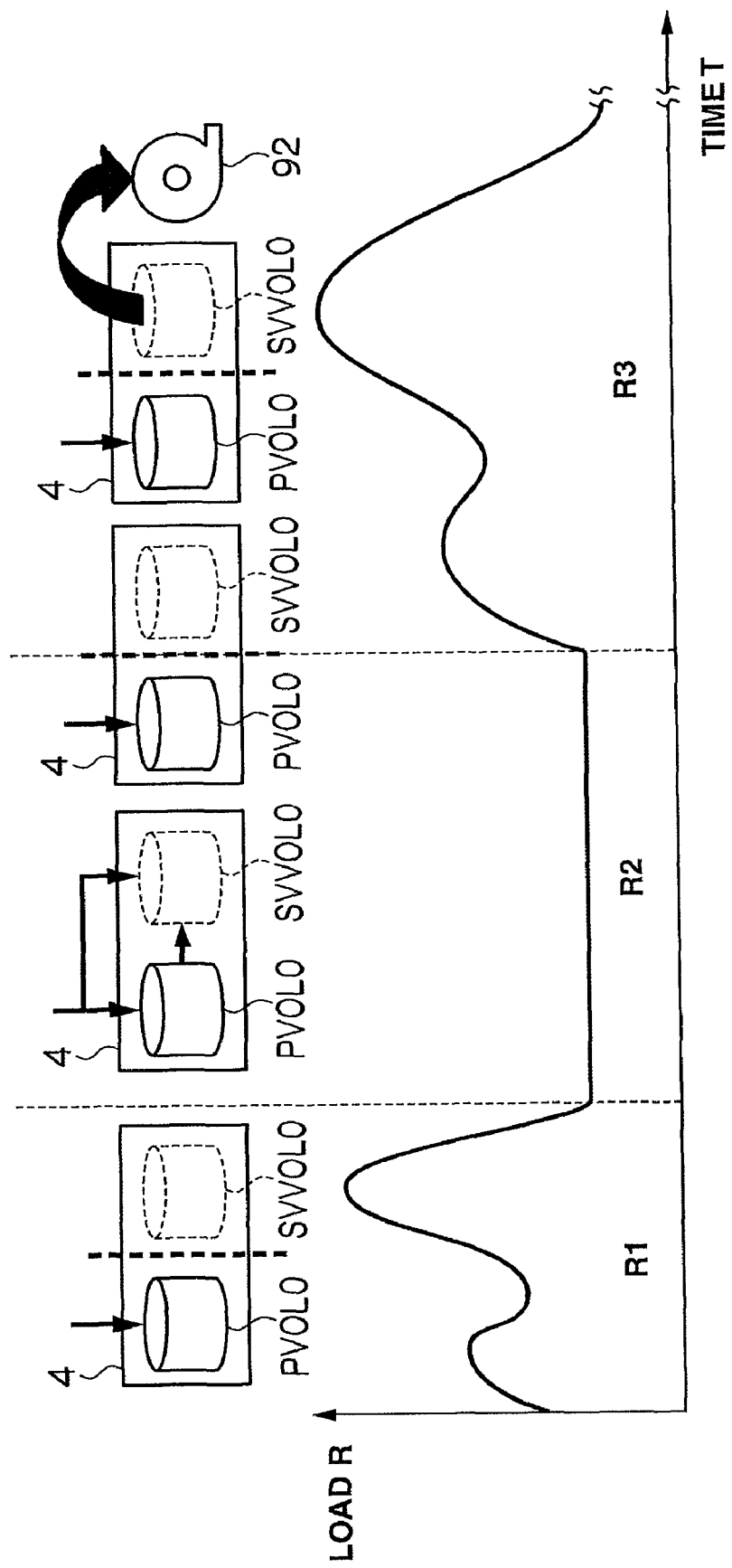
FIG. 7 is a conceptual diagram illustrating the operation of the storage system according to the first embodiment.

In the graph shown in FIG. 7, the vertical scale R indicates the load on the storage system 1, while the horizontal scale T indicates time, e.g. one day or one week. In the graph, the time periods R1 and R3 where the line extends curvedly in the direction of the vertical scale R show a high load period, i.e., a time period during which commands and data are being sent and received frequently between the host apparatus 2 and the virtualization apparatus 4 in the storage system 1. Meanwhile, the time period R2 where the line extends straight in the direction of the horizontal scale T shows a low load period, i.e. a time period during which commands and data are not frequently being sent and received between the host apparatus 2 and the virtualization apparatus 4 in the storage system 1.

Above the graph shown in FIG. 7, the flow of data between the actual volume PVOL0 and the virtual volume $SVVOL_0$, both in the virtualization apparatus 4, and the flow of the relevant replicated data between the virtual volume $SVVOL_0$ and the tape cartridge 92 in the external storage apparatus 5 are described, the flows varying in accordance with the load R and time T.

In the high load period R1, which is, for example, during the day, the storage system is operated, with the actual volume $PVOL_0$ and the virtual volume $SVVOL_0$ in the virtualization apparatus 4 separated from each other. During this high load period R1, data sent from the host apparatus 2 is stored in the actual volume $PVOL_0$ in the virtualization apparatus 4.

Then, in the low load period R2, which is, for example, during the night, in order to match the data stored in the actual volume $PVOL_0$ and the replicated data stored in the virtual volume $SVVOL_0$ in the virtualization apparatus 4, the replicated data is updated by copying the difference data between the actual volume $PVOL_0$ and the virtual volume $SVVOL_0$ from the actual volume $PVOL_0$ to the virtual volume $SVVOL_0$. In the above process, the replicated data is actually stored in the logical volume $LU_0$ in the external storage apparatus 5, which functions as an actual storage area for the virtual volume $SVVOL_0$. As a result, the virtual volume $SVVOL_0$ stores the replicated data of the latest generation.

This embodiment employs copying the difference data between the actual volume $PVOL_0$ and the virtual volume $SVVOL_0$, but it is also possible to copy the incremental data between the actual volume $PVOL_0$ and the virtual volume $SVVOL_0$, and any copy method can be used as long as it can match the data in the actual volume $PVOL_0$ and the data in the virtual volume $SVVOL_0$.

If the storage system 1 is again under a high load (high load period R3), the storage system 1 is operated, with the actual volume $PVOL_0$ and the virtual volume $SVVOL_0$ in the virtualization apparatus 4 separated from each other. After that separation, the replicated data temporarily stored in the cache 43 in the virtualization apparatus 4 is stored in the logical volume $LU_0$. After that, using the logical volume $LU_0$ that is the actual storage area for the separated virtual volume $SVVOL_0$, the external storage apparatus 5 backs up the replicated data of the latest generation stored in the logical volume $LU_0$ on the tape cartridges 92.

As described above, in the storage system 1 according to this embodiment, the external storage apparatus 5 can execute backup processing internally without affecting the virtualization apparatus 4.

(1-3-1) Backup Processing in the Host Apparatus

In order to realize the above-described operation of the storage system 1, the CPU 20 in the host apparatus 2 executes backup processing based on the mirror volume control program 22 and the backup control program 23.

Figure 8:
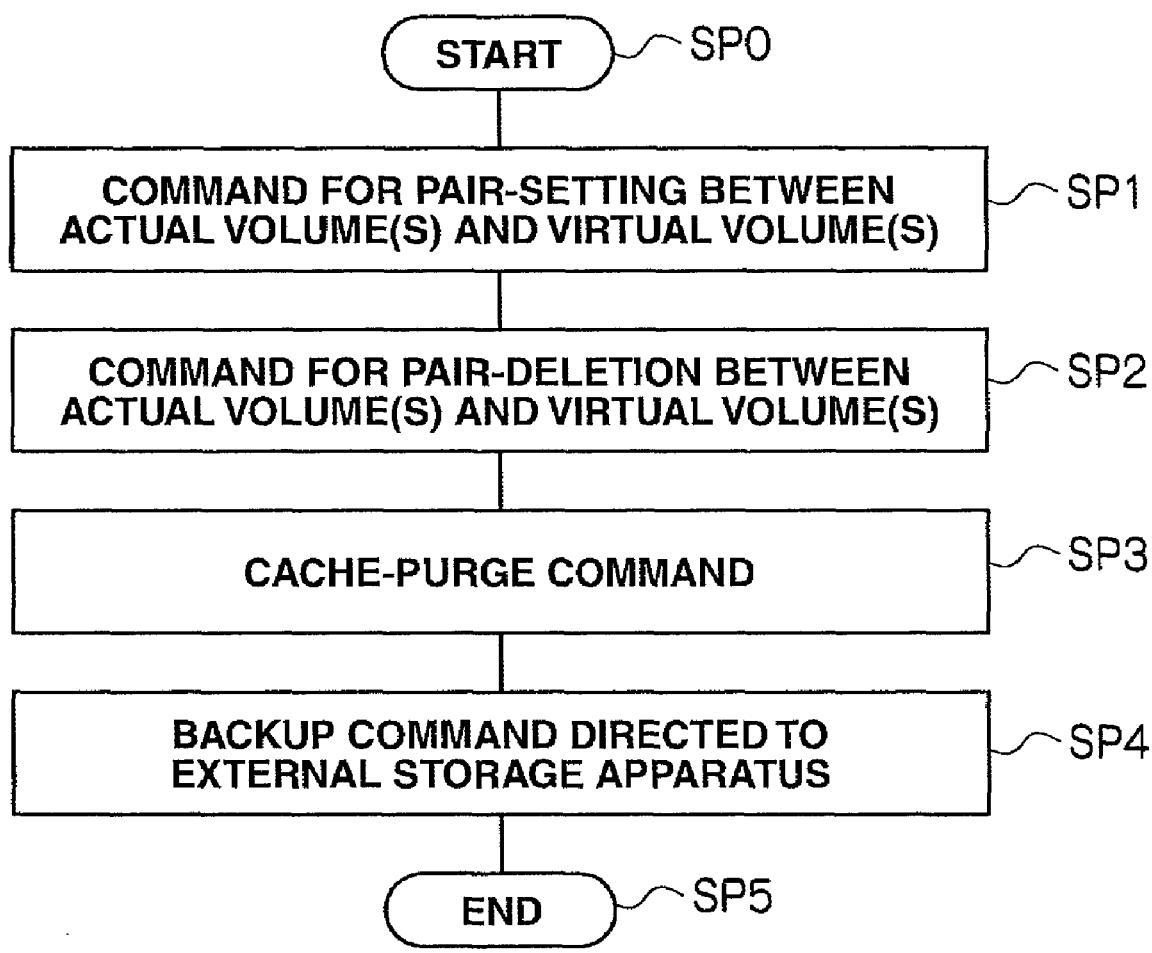
FIG. 8 is a flowchart illustrating backup processing in a host apparatus according to the first embodiment.

More specifically, as shown in FIG. 8, the CPU 20 in the host apparatus 2 starts backup processing during the low load period R2, which is, for example, during the night (SP0). The CPU 20 sends a command instructing pairing of the actual volumes $PVOL_0$-$PVOL_n$ with the virtual volumes $SVVOL_0$-$SVVOL_n$ so that the actual volumes are mirrored by the virtual volumes (SP1). Then, in the virtualization apparatus 4, data sent from the host apparatus 2 is stored in the paired actual volumes $PVOL_0$-$PVOL_n$, and the replicated data for that data is stored in the relevant virtual volumes $SVVOL_0$-$SVVOL_n$. After that, the CPU 20 instructs deletion of the paring between the actual volumes $PVOL_0$-$PVOL_n$ and the virtual volumes $SVVOL_0$-$SVVOL_n$ (SP2).

The CPU 20 then sends a cache-purge command so that the replicated data temporarily stored in the cache 43 in the virtualization apparatus 4 is stored in the logical volumes $LU_0$-$LU_n$ in the external storage apparatus 5, which are associated with the virtual volumes $SVVOL_0$-$SVVOL_n$ (SP3).

After that, the CPU 20 gives the external storage apparatus 5 a command to back up the replicated data stored in the logical volumes $LU_0$-$LU_n$ (SP4), and ends backup processing on the host apparatus 2-side (SP5).

Note that the CPU 20 executes backup processing via the backup control program 23 in step SP3 above, and via the mirror volume control program 22 in the other steps SP1, SP2 and SP4.

(1-3-2) Backup Processing between the Host Apparatus and the External Storage Apparatus Next, the sequence where the host apparatus 2 gives a command to execute backup processing to the external storage apparatus 5, and in response, the external storage apparatus 5 executes and completes the backup processing will be explained.

Figure 9:
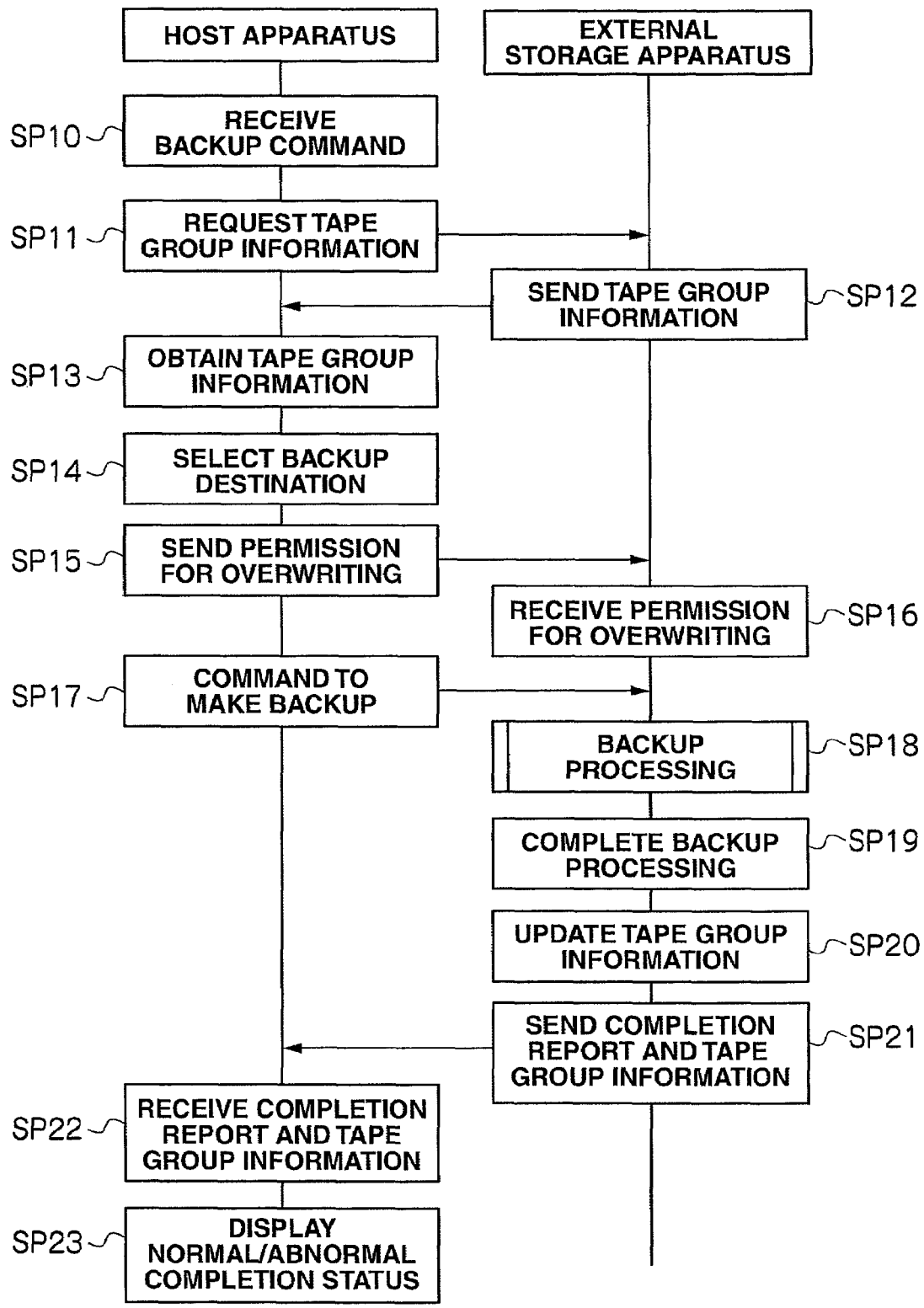
FIG. 9 is a sequence chart illustrating backup processing according to the first embodiment.

As shown in FIG. 9, when the host apparatus 2 receives a backup command from a user (SP10), the host apparatus 2 sends the external storage apparatus 5 a request for the tape group information 63 (SP11).

When receiving the above request, the external storage apparatus 5 sends the tape group information 63 in the memory 61 to the host apparatus 2 (SP12).

When obtaining the tape group information 63 sent from the external storage apparatus 5 (SP13), the host apparatus 2 starts selecting a backup destination (SP14). More specifically, the host apparatus 2 reads the generation management table 24, and checks the backup source logical volume number(s) and the corresponding backup destination tape group numbers. Then, the host apparatus 2 refers to the backup date information 63B in the obtained tape group information 63, selects, from among the several candidate backup destination tape group numbers, the tape group having the oldest backup update date, and specifies it as the backup destination tape group.

When the tape group(s) has been specified, the host apparatus 2 permits the external storage apparatus 5 to overwrite the data in the specified tape group(s) with the replicated data (SP15). The external storage apparatus 5 receives that permission for overwriting (SP16).

Then, the host apparatus 2 instructs the external storage apparatus 5 to make a backup of the replicated data and store it in the specified tape group(s) (SP17). The backup instruction command includes the logical volume number(s), the specified tape group number(s), and the random keyword(s) set by the user.

When receiving the backup command from the host apparatus 2, the external storage apparatus 5 executes backup processing for the specified tape group(s) (SP18). The details of the backup processing will be explained later. When completing the backup processing (SP19), the external storage apparatus 5 updates the tape group information 63 (SP20).

Then, the external storage apparatus 5 sends a backup processing completion report and the updated tape group information 63 so that the host apparatus 2 can know of the completion of the backup processing and its status (normal/abnormal completion) (SP21).

When receiving the backup processing completion report and the updated tape group information 63 (SP22), the host apparatus 2 displays the normal/abnormal completion of the backup processing (SP23) on the screen of the host apparatus 2, and ends the processing.

(1-3-3) Backup Processing in the External Storage Apparatus

Next, how the external storage apparatus 5, when it receives a backup command from the host apparatus 2, executes backup processing within the external storage apparatus 5 will be explained. Backup processing is executed by the CPU 60 in the external storage apparatus 5 using the backup program 62.

Figure 10:
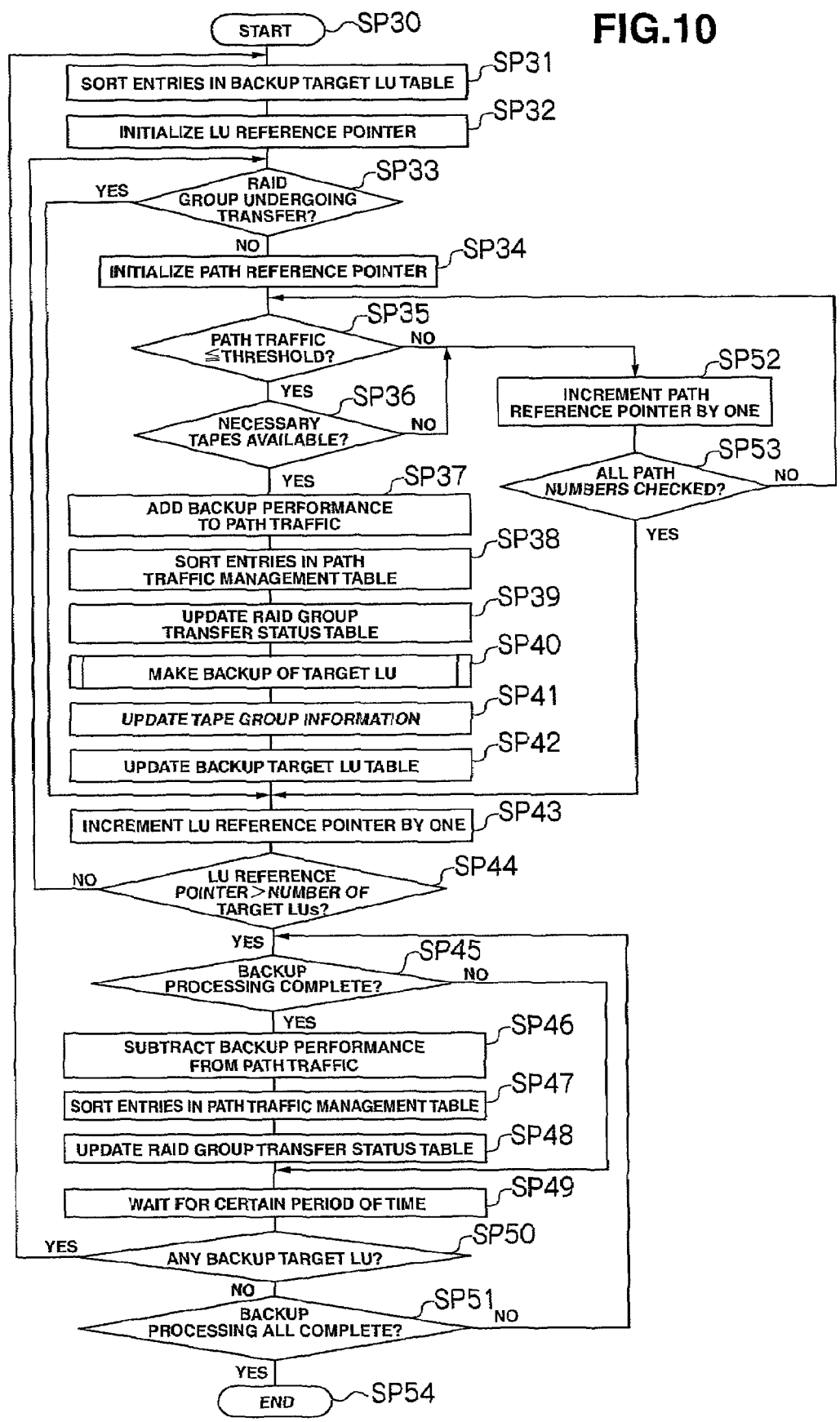
FIG. 10 is a flowchart illustrating backup processing in an external storage apparatus according to the first embodiment.

As shown in FIG. 10, first, the CPU 60 in the external storage apparatus 5 starts backup processing in response to a backup command from the host apparatus 2 (SP30), and sorts the entries for each RAID group in the backup target LU table 64 in descending order of backup performance (SP31).

The CPU 60 then initializes the value for the reference pointer, which is used for the logical volumes $LU_0$-$LU_n$ in the backup program 62, setting the value calculated in the previous processing back to "0" (SP32).

Then, the CPU 60 refers to the RAID group transfer status table 66 for the status of data transfer for the RAID group that includes the logical volume number(s) specified in the backup command from the host apparatus 2 (SP33). This is to execute backup processing [for each logical volume] with a certain time lag to achieve the optimum backup performance.

If the CPU 60 finds that the RAID group that includes the specified logical volume number(s) is undergoing data transfer (SP33: YES), it increments the value of the reference pointer for the logical volumes (that currently points to, for example, $LU_0$) by one (SP43) to shift the backup processing target to the next logical volume (e.g. LU1). After that, the CPU 60 executes step SP44 (judging whether to continue backup processing for the next logical volume).

On the other hand, if the CPU 60 finds that the RAID group that includes the specified logical volume number(s) is not undergoing data transfer (SP33: NO), the CPU 60 initializes the value for the reference pointer, which is used for the path(s) P in the backup program 62 (SP34). Then, the CPU 60 refers to the path traffic management table 65, and checks whether the path traffic will still be less than or equal to the traffic threshold even if the amount of replicated data to be transferred, which is stored in the current target logical volume specified, is added to the value in the "current traffic" field 65C (SP35).

If the CPU 60 finds that the path traffic will exceed the threshold (SP35: NO), the CPU 60 increments the value of the reference pointer for the path(s) P by one (SP52), and then checks whether all path numbers have been checked (SP53). In this embodiment, since there are four paths, the CPU 60 checks all four paths. Also, even if the path traffic has been found to be less than or equal to the threshold (SP35: YES), if the CPU 60 finds, in the subsequent checking of whether the required tape cartridge(s) 92 are available or not (SP36), that the required tape cartridge(s) 92 are not available (SP36: NO), the CPU 60 executes the above-explained steps SP52 and SP53 too.

If the CPU 60 finds that some path numbers have not yet been checked (SP53: NO), the CPU 60 checks the next path number with respect to whether the path traffic will still be less than or equal to the threshold (SP35), so that a particular path P can be specified.

If the CPU 60 finds that all path numbers have been checked (SP53: YES), the CPU 60 then goes to the process in step SP43.

If the CPU 60 finds that the path traffic will still be less than or equal to the threshold, and specifies that path (SP35: YES), the CPU 60 then checks whether the tape cartridge(s) 92 necessary for actually storing the replicated data are available in the specified tape group number (SP36). If the CPU 60 finds that the tape cartridge(s) required for actual storage are available in the specified tape group number (SP36: YES), the CPU 60 adds the value in the "backup performance" field 64C of the backup target LU table 64, which is the value associated with the current target logical volume number specified, to the value in the "current traffic" field 65C of the path traffic management table 65 (SP37).

After that addition, the CPU 60 sorts the entries in the path traffic management table 65 in ascending order of current traffic, for the next check (SP38).

When the CPU 60 specifies a particular path, the CPU 60 then updates the RAID group transfer status table 66 (SP39). More specifically, the CPU 60 sets a flag of "1" for the RAID group (e.g. RAID group "0") that includes the specified logical volume(s) (e.g. $LU_0$-$LU_3$), to show that the RAID group is undergoing data transfer.

After that, the CPU 60 backs up the replicated data stored in the current target logical volume (backup source) on the tape cartridges 92 in the specified backup destination (SP40). At that time, the CPU 60 measures the transfer rate during that backup process, and makes a record as backup history.

In addition, at the time of the above backup process, the CPU 60 updates the tape group information 63 (SP41). More specifically, the CPU 60 updates the backup date information 63B to the date when the current target backup source logical volume has been backed up, and also changes the copy status information 63F to backup mode. The CPU 60 also updates the other items 63C-63E and 63G in the tape group information 63.

Then, in order to delete the current target logical volume for which the replicated data has already been backed up, the CPU 60 updates the backup target LU table 64 (SP42). The CPU 60 stores, in the relevant "backup performance" field 64C in the backup target LU table 64, the data transfer rate at which the replicated data in that logical volume has been transferred to be backed up on the tape cartridges 92.

When the backup processing for the current target logical volume (e.g. $LU_0$) has been completed, the CPU 60 then increments the value of the reference pointer for the logical volumes by one (SP43), and shifts the backup processing target to the next logical volume (e.g. $LU_1$).

When the CPU 60 moves to the next target logical volume (e.g. $LU_1$), the CPU 60 checks whether the value of the reference pointer that points to the logical volume $LU_1$ exceeds the number of backup target logical volumes (SP44). Then, if the CPU 60 finds that the value of the reference pointer (that points to the logical volume $LU_1$) does not exceed the number of backup target logical volumes (SP44: NO), the CPU 60 goes back to step SP33, and continues executing backup processing for the next target logical volume $LU_1$. The CPU 60 repeats the processes in steps SP33-SP44 for the target logical volumes (e.g. $LU_0$-$LU_3$).

On the other hand, if the CPU 60 has completed backup processing for the target logical volumes (e.g. $LU_0$-$LU_3$), and if the CPU 60 finds that the value of the reference pointer (that points to, for example, $LU_4$) exceeds the number of backup target logical volumes (SP44: YES), the CPU 60 then checks whether the necessary backup processing has been completed or not (SP45).

If the CPU 60 finds that the necessary backup processing has not been completed (SP45: NO), the CPU 60 goes to step SP49, which will be explained later.

If the CPU 60 finds that the backup processing has been completed (SP45: YES), the CPU 60 subtracts, from the value in the relevant "current traffic" field(s) 65C of the path traffic management table 65, the value in the "backup performance" field(s) 64C of the backup target LU table 64 associated with the logical volume number(s) specified (SP46).

After that subtraction, the CPU 60 again sorts the entries in the path traffic management table 65 in ascending order of current traffic (SP47).

Also, the CPU 60 updates the RAID group transfer status table 66 (SP48). More specifically, the CPU 60 changes the value in the "transfer flag" field 66B for the RAID group number (e.g. RAID group "0") that includes the specified logical volume(s) (e.g. $LU_0$-$LU_3$), from "1" to "0."

After waiting for a certain period of time (SP49), the CPU 60 checks whether there is any backup target logical volume or not (SP50).

If the CPU 60 finds that there is a backup target logical volume (SP50: YES), the CPU 60 goes back to step SP31 and executes backup processing again.

On the other hand, if the CPU 60 finds that there is no backup target logical volume (SP50: NO), the CPU 60 then checks whether the necessary backup processing has all been completed or not (SP51).

If the CPU 60 finds that the backup processing has not all been completed (SP51: NO), the CPU 60 goes back to step SP45.

If the CPU 60 finds that the backup processing has all been completed (SP51: YES), that means that the replicated data in all of the logical volume(s) (e.g. $LU_0$-$LU_3$) specified by the host apparatus 2 has been backed up on the tape cartridges 92 in all the specified tape groups (e.g. 0-9), so the CPU 60 ends the backup processing (SP54).

The backup processing is executed within the external storage apparatus 5 in the above-explained steps, and accordingly, replicated data can be backed up, without affecting the virtualization apparatus 4.

(1-34) Restoration Processing in the Host Apparatus

Processing for restoring data in the host apparatus 2 using the replicated data (i.e., processing for returning the replicated data to the position that it was copied from) after the replicated data has been backed up and stored on the tape cartridges 92 in the external storage apparatus 5 as described above will be explained below. Upon receipt of a user's command, the CPU 20 in the host apparatus 2 executes restoration processing in accordance with the mirror volume control program 22 and backup control program 23. Note that if the replicated data to be used is the replicated data of the latest generation, the data in the host apparatus 2 can be restored by copying the replicated data from the virtual volumes ($SVVOL_0$-$SVVOL_n$), not the tape cartridges 92.

Figure 11:
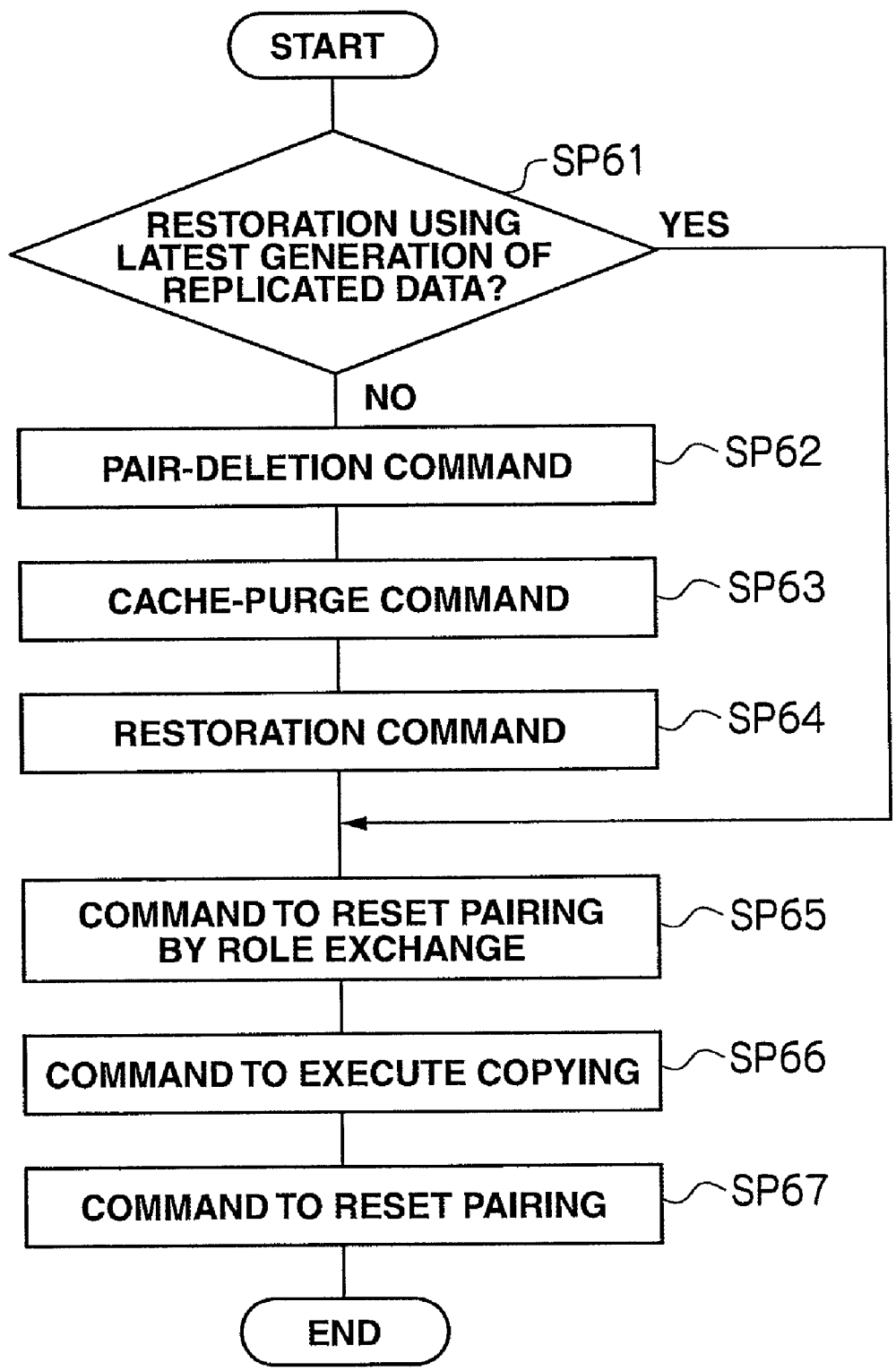
FIG. 11 is a flowchart illustrating restoration processing in a host apparatus according to the first embodiment.

More specifically, as shown in FIG. 11, the user first judges whether to use the latest generation of replicated data or an older generation of replicated data stored on the tapes, to restore data in the host apparatus 2 (SP61).

If the user has decided to use an older generation of replicated data stored on the tapes (SP61: NO), the CPU 20 in the host apparatus 2 deletes the pair setting for the relevant virtual volume (e.g. $SVVOL_0$) and the corresponding actual volume (e.g. $PVOL_0$) to separate them from each other, the virtual volume being associated with the logical volume (e.g. $LU_0$) that is the backup source for the target replicated data stored on the tapes (SP62).

After that, the CPU 20 in the host apparatus 2 sends an cache purge command to the virtualization apparatus 4 to prevent the replicated data in the cache 43 from being transferred (SP63), and destroys the replicated data temporarily stored in the cache 43 in the virtualization apparatus 4.

Then the CPU 20 in the host apparatus 2 instructs the virtualization apparatus 4 to copy, for restoration, the older generation replicated data stored on the tape cartridges 92 back to the logical volume $LU_0$, in which the replicated data of the latest generation is currently stored (SP64).

Next, the CPU 20 in the host apparatus 2 sends a command to reset the paring by exchanging the roles of the relevant virtual volume $SVVOL_0$ in the virtualization apparatus 4 and the actual volume $PVOL_0$ paired with that volume $SVVOL_0$ to form a new pair, the virtual volume $SVVOL_0$ being associated with the logical volume $LU_0$ that is the target of the restoration command (SP65). In other words, the CPU 20 in the host apparatus 2 instructs setting of a new pair between the actual volume $PVOL_0$ and the logical volume $LU_0$ that functions an actual storage area for the virtual volume $SVVOL_0$, the former as a secondary volume and the latter as a primary logical volume. Then, the actual volume $PVOL_0$ reset as a secondary logical volume receives data input/output requests from the host apparatus 2.

The CPU 20 in the host apparatus 2 instructs the virtualization apparatus 4 to copy the replicated data, which has been stored in the logical volume $LU_0$ for restoration, to the actual volume $PVOL_0$ in the virtualization apparatus 4 (SP66).

In response to the above instruction, the CPU 42 in the virtualization apparatus 4 copies the replicated data from the logical volume $LU_0$ to the actual volume $PVOL_0$ in the virtualization apparatus 4, and after that, the CPU 20 in the host apparatus 2 again instructs the virtualization apparatus 4 to again exchange the roles of the actual volume $PVOL_0$ and the logical volume $LU_0$ that functions as an actual storage area for the virtual volume $SVVOL_0$, the former as a primary logical volume and the latter as a secondary volume (SP67), to return to the original pairing, and ends the restoration processing.

If the user has decided to use the replicated data of the latest generation for restoration in step SP61 (SP61: YES), the CPU 20 executes steps SP65-SP67, and ends the restoration processing.

(1-3-5) Restoration Processing between the Host Apparatus and the External Storage Apparatus Using Tapes Next, the sequence where the host apparatus 2 gives a restoration command to the external storage apparatus 5, and, in response, the external storage apparatus 5 completes restoration processing using (backup) data on the tape cartridges 92 will be explained. In this embodiment, the case where restoration processing is executed using a keyword designated by a user when making the backup data is explained, but restoration processing may also be executed by the user directly specifying a restoration target tape group number.

Figure 12:
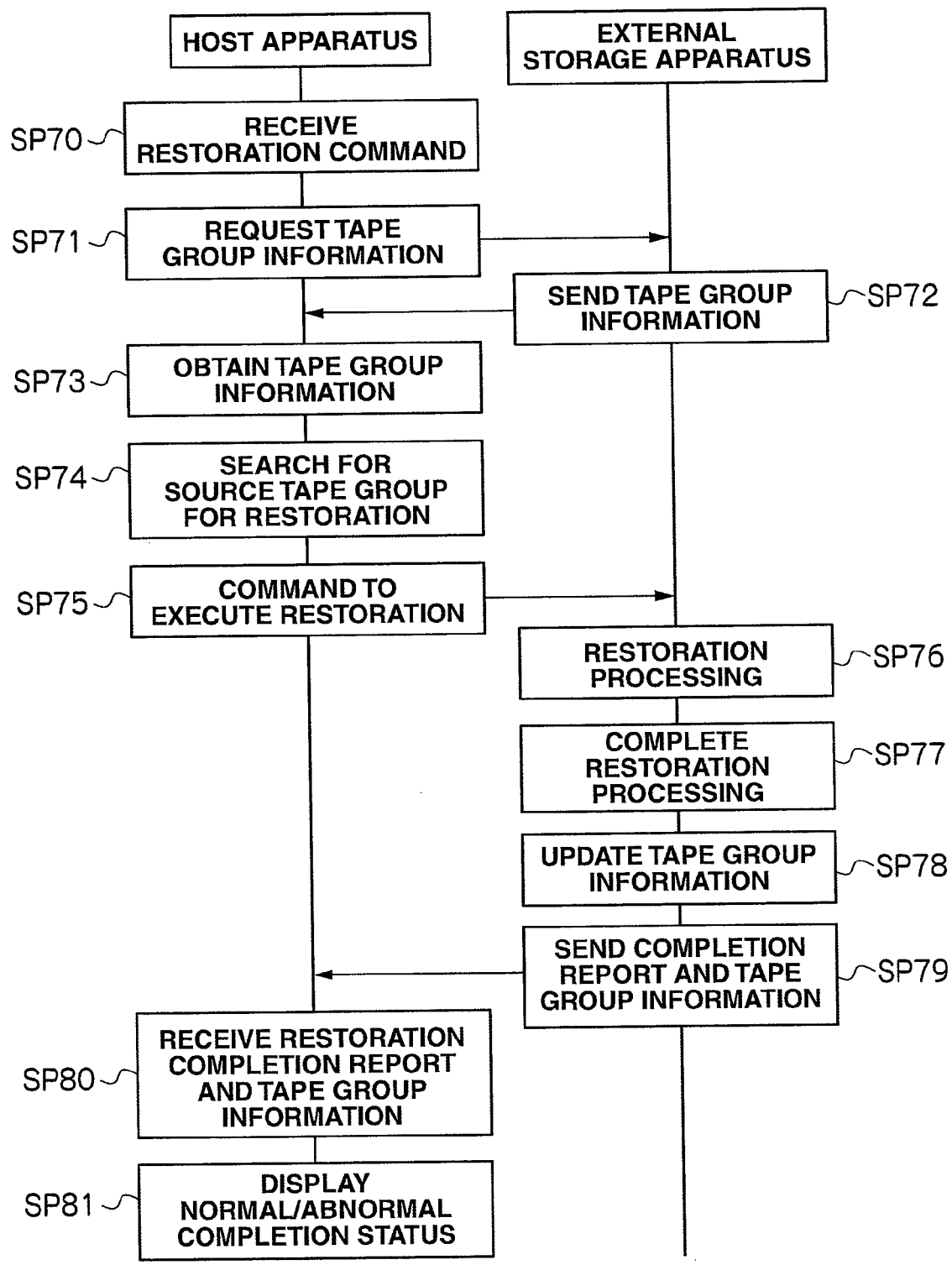
FIG. 12 is a sequence chart illustrating restoration processing according to the first embodiment.

As shown in FIG. 12, the host apparatus 2 first receives from a user a restoration command with, as a parameter, the keyword that the user designated when making the relevant backup data (SP70), and the host apparatus 2, in response, sends the external storage apparatus 5 a request for the tape group information 63 (SP71).

When receiving the above request, the external storage apparatus 5 sends the host apparatus 2 the tape group information 63 stored in the memory 61 (SP72).

When obtaining the tape group information 63 sent from the external storage apparatus 5 (SP73), the host apparatus 2 searches for the restoration source tape group (SP74). More specifically, the host apparatus 2 searches the "keyword" information 63C included in the tape group information 63 for the keyword designated by the user, and specifies the tape group number associated with the keyword that matches the designated one. For example, the tape group "0" is specified as the source tape group for restoration.

Then, the host apparatus 2 instructs the external storage apparatus 5 to copy the replicated data in the specified tape group 0 to the relevant logical volume for restoration (SP75). The above restoration instruction command includes the destination logical volume number for restoration and the specified tape group number. For example, the logical volume number "0" is the destination and the tape group number "0" is specified.

When receiving the restoration command from the host apparatus 2, the external storage apparatus 5 executes restoration processing using the specified tape group 0 (SP76). The external storage apparatus 5 copies the replicated data of an older generation stored on the tape cartridges in the specified tape group "0", to the destination logical volume $LU_0$ for restoration. After that, the external storage apparatus 5 ends the restoration processing (SP77), and then updates the tape group information 63 (SP78).

Then, in order to inform the host apparatus 2 of the completion of restoration and the completion status (normal/abnormal), the external storage apparatus 5 sends a restoration completion report and the updated tape group information 63 (SP79).

When receiving the restoration completion report and the updated tape group information 63 (SP80), the host apparatus 2 displays the normal/abnormal completion status of the restoration processing on the screen in the host apparatus 2 (SP81), and ends the processing.

(1-4) Advantageous Effects of the First Embodiment

According to the first embodiment, an externally connected storage apparatus and a tape library apparatus are formed as one apparatus, i.e., an external storage apparatus 5. Since the external storage apparatus 5 backs up replicated data separately from the virtualization apparatus 4, it is possible to reduce the load on the virtualization apparatus 4 during backup and improve performance in the main operation of the virtualization apparatus 4, and it is also possible to improve backup performance.

Also, according to the first embodiment, since an external storage apparatus 5 is formed, the devices and software required decrease, resulting in cost reduction, and the apparatus reliability can also be improved.

Moreover, according to the first embodiment, it is possible to store replicated data of the latest generation in the logical volumes associated with the virtual volumes, while storing the latest generation and several older generations of that replicated data on magnetic tapes on a per-volume basis. Accordingly, inexpensive and high performance backup can be achieved.

(2) Second Embodiment (2-1) Storage System Configuration in the Second Embodiment A storage system according to the second embodiment will be described below.

Figure 13:
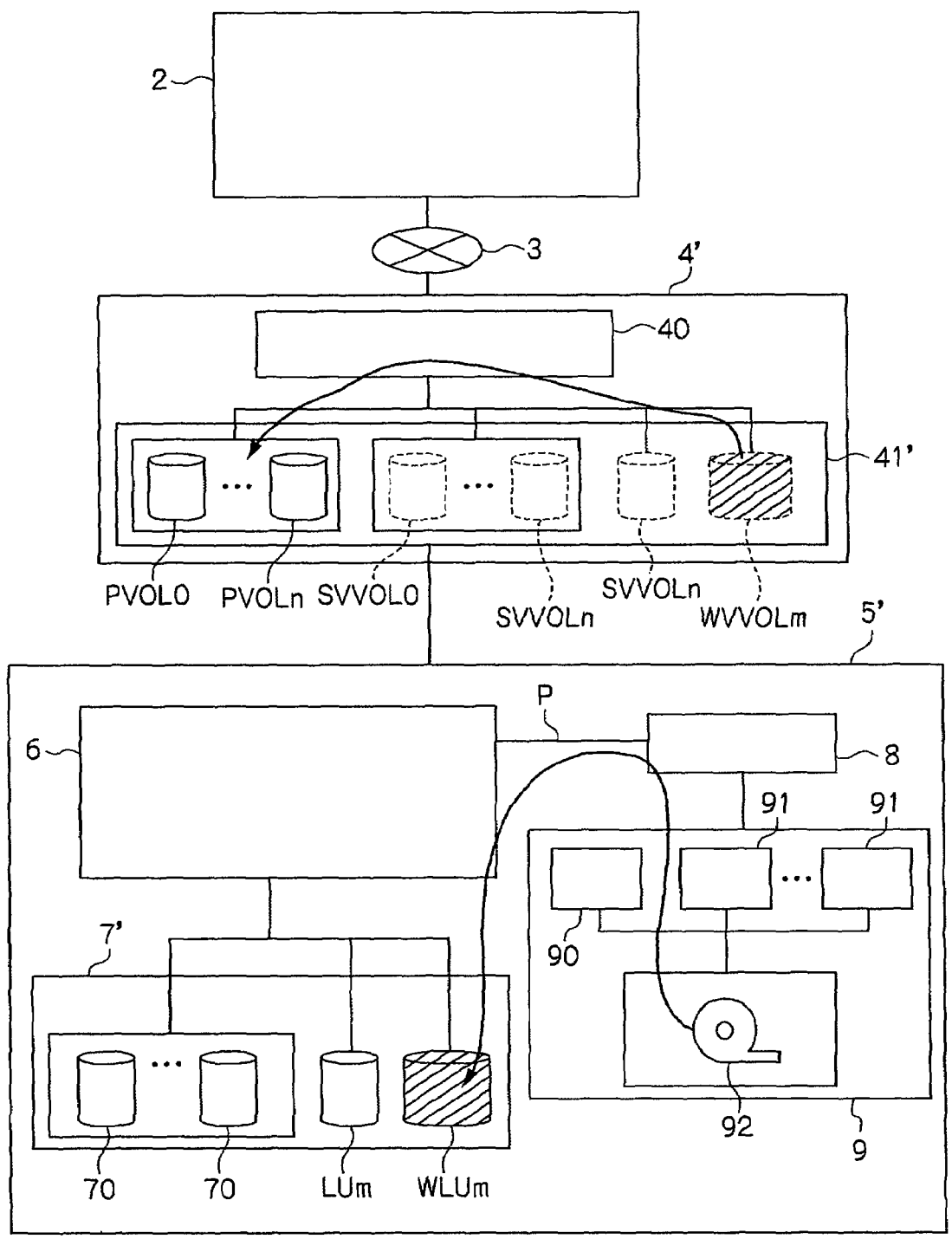
FIG. 13 is a block diagram illustrating the overall configuration of a storage system according to a second embodiment.

In FIG. 13, the reference numeral 1' shows the overall storage system according to the second embodiment. In this embodiment, a work virtual volume WVVOL having the same capacity as that of the actual volumes $PVOL_0$-$PVOL_n$ is formed in a device unit 41' of a virtualization apparatus 4'. Also, a work logical volume WLU that functions as an actual storage area for the work virtual volume WVVOL is formed in a device unit 7' in an external storage apparatus 5'. The host apparatus 2 makes the work logical volume WLU recognize the OS installed in the host apparatus 2. Other components correspond to those already described in the first embodiment, so their explanation will be omitted.

When executing restoration processing using replicated data stored on tape cartridges 92 in the external storage apparatus 5', the replicated data is copied to the work logical volume WLU on a per-file basis.

(2-2) Advantageous Effects of the Second Embodiment

According to the second embodiment, a work logical volume that can recognize the OS installed in the host apparatus 2, and a work virtual volume WVVOL are formed, and accordingly, file-based restoration can be realized.

(3) Other Embodiments

In the above embodiments, as a unit for executing step SP17, a copy unit for copying the replicated data stored in the logical volumes $LU_0$-$LU_n$ to the tape cartridges 92 is provided in the external storage apparatus 5. However, the copy unit may be separate hardware.

Also, the external storage apparatus 5' is provided with the controller unit 6 that, in response to a restoration command from the host apparatus 2, copies back the replicated data stored on the tape on a per-file basis for restoration, and stores the replicated data that has been copied back in the work logical volume. However, the controller unit may be separate hardware.

The present invention can widely be applied in storage systems having one or more storage apparatuses, or various other types of storage systems.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A storage system comprising:
a virtualization apparatus having:
  an actual volume for storing data sent from a host apparatus, formed in a storage area provided by a physical disk;
  a virtual volume paired with the actual volume, for storing replicated data for the data; and
  a work virtual volume for storing the replicated data when it has been copied back for restoration; and
an external storage apparatus having:
  a logical volume that functions as an actual storage area for the virtual volume;
  a storage tape associated with the logical volume, for storing the replicated data; and
  a work logical volume associated with the work virtual volume,
wherein the external storage apparatus has:
a controller for controlling: first processing for making a backup of the replicated data in the logical volume on the tape, and second processing for copying the replicated data backup in the tape to the work logical volume for restoration;
a switch for executing data transfer between the logical volume or the work logical volume and the tape, via switching between a plurality of paths;
a first table for managing a current data traffic of each of the paths; and
a second table for managing a data traffic when a backup of the replicated data in the logical volume was previously made in the tape,
the work virtual volume and the work logical volume are configured to recognize an operating system installed in the host apparatus, and
when executing the first processing, the controller:
checks that data transfer is not being executed for a RAID group including a backup target logical volume;
adds the data traffic in the second table to the data traffic in the first table, and specifies, from among the paths, a path whose data traffic resulting from the addition does not exceed a maximum traffic, as a path for data transfer;
transfers the replicated data from the backup target volume to the tape, via the path for data transfer; and
when executing the second processing, realizes file-based restoration by filed-based copying the replicated data in the tape to the work logical volume for restoration.

2. The storage system according to claim 1, wherein the controller executes the first processing after cancelling a pairing between the actual volume and the virtual volume in the virtualization apparatus.

3. The storage system according to claim 1,
wherein the controller has tape group information for managing update history concerning backups of the replicated data stored in some or all of a plurality of tapes, and executes the first processing for one or more of the tapes in accordance with the tape group information.

4. A data management method carried out in a storage system, where the storage system includes:
a virtualization apparatus having:
an actual volume for storing data sent from a host apparatus, formed in a storage area provided by a physical disk;
a virtual volume paired with the actual volume, for storing replicated data for the data; and
a work virtual volume for storing the replicated data when it has been copied back for restoration; and
an external storage apparatus having:
a logical volume that functions as an actual storage area for the virtual volume;
a storage tape associated with the logical volume, for storing the replicated data; and
a work logical volume associated with the work virtual volume,
the data management method comprising the external storage apparatus effecting operation of:
controlling: first processing for making a backup of the replicated data in the logical volume on the tape, and second processing for copying the replicated data backup in the tape to the work logical volume for restoration;
executing data transfer between the logical volume or the work logical volume and the tape, via switching between a plurality of paths;
maintaining a first table for managing a current data traffic of each of the paths; and
maintaining a second table for managing a data traffic when a backup of the replicated data in the logical volume was previously made in the tape,
wherein the work virtual volume and the work logical volume are configured to recognize an operating system installed in the host apparatus, and
when in executing the first processing, the controlling:
checks that data transfer is not being executed for a RAID group including a backup target logical volume;
adds the data traffic in the second table to the data traffic in the first table, and specifies, from among the paths, a path whose data traffic resulting from the addition does not exceed a maximum traffic, as a path for data transfer;
transfers the replicated data from the backup target volume to the tape, via the path for data transfer; and
when executing the second processing, realizes file-based restoration by filed-based copying the replicated data in the tape to the work logical volume for restoration.

5. The data management method according to claim 4, wherein the controlling executes the first processing after cancelling a pairing between the actual volume and the virtual volume in the virtualization apparatus.

6. The data management method according to claim 4,
wherein the controlling maintains tape group information for managing update history concerning backups of the replicated data stored in some or all of a plurality of tapes, and executes the first processing for one or more of the tapes in accordance with the tape group information.

7. A non-transitory computer memory embodying one or more programs for executing a data management method carried out in a storage system, where the storage system includes:
a virtualization apparatus having:
an actual volume for storing data sent from a host apparatus, formed in a storage area provided by a physical disk;
a virtual volume paired with the actual volume, for storing replicated data for the data; and
a work virtual volume for storing the replicated data when it has been copied back for restoration; and
an external storage apparatus having:
a logical volume that functions as an actual storage area for the virtual volume;
a storage tape associated with the logical volume, for storing the replicated data; and
a work logical volume associated with the work virtual volume, the one or more programs, when executed, causing operations of:
controlling: first processing for making a backup of the replicated data in the logical volume on the tape, and second processing for copying the replicated data backup in the tape to the work logical volume for restoration;
executing data transfer between the logical volume or the work logical volume and the tape, via switching between a plurality of paths;
maintaining a first table for managing a current data traffic of each of the paths; and
maintaining a second table for managing a data traffic when a backup of the replicated data in the logical volume was previously made in the tape,
wherein the work virtual volume and the work logical volume are configured to recognize an operating system installed in the host apparatus, and
when executing the first processing, the controlling:
checks that data transfer is not being executed for a RAID group including a backup target logical volume;
adds the data traffic in the second table to the data traffic in the first table, and specifies, from among the paths, a path whose data traffic resulting from the addition does not exceed a maximum traffic, as a path for data transfer;
transfers the replicated data from the backup target volume to the tape, via the path for data transfer; and
when executing the second processing, realizes file-based restoration by filed-based copying the replicated data in the tape to the work logical volume for restoration.

8. The data management method according to claim 7, wherein the controlling executes the first processing after cancelling a pairing between the actual volume and the virtual volume in the virtualization apparatus.

9. The data management method according to claim 7,
wherein the controlling maintains tape group information for managing update history concerning backups of the replicated data stored in some or all of a plurality of tapes, and executes the first processing for one or more of the tapes in accordance with the tape group information.

* * * * *